(12) United States Patent
Klein

(10) Patent No.: US 7,435,347 B2
(45) Date of Patent: Oct. 14, 2008

(54) FILTER DEVICE AND PARTS THEREOF AND A METHOD FOR OPERATING OF THE FILTER DEVICE

(75) Inventor: Volkmar Klein, Zweibrücken (DE)

(73) Assignee: Hydac Filtertechnik GmbH., Sulzbach/Saar (DE)

( * ) Notice: Subject to any disclaimer, the term of this patent is extended or adjusted under 35 U.S.C. 154(b) by 36 days.

(21) Appl. No.: 11/516,060

(22) Filed: Sep. 6, 2006

(65) Prior Publication Data

US 2008/0047890 A1 Feb. 28, 2008

(30) Foreign Application Priority Data

Aug. 25, 2006 (DE) .................. 10 2006 039 826

(51) Int. Cl.
  *B01D 35/153* (2006.01)
(52) U.S. Cl. .............. 210/234; 210/235; 210/100; 210/90; 210/739; 210/741; 251/902; 137/512.15
(58) Field of Classification Search ............... 210/234, 210/235, 100, 739, 741, 90; 251/902; 137/512.15
  See application file for complete search history.

(56) References Cited

U.S. PATENT DOCUMENTS

| 3,307,819 | A | * | 3/1967 | Cocito | 248/363 |
|---|---|---|---|---|---|
| 3,319,791 | A | * | 5/1967 | Horne | 210/234 |
| 3,385,475 | A | * | 5/1968 | Loe | 222/83.5 |
| 3,485,368 | A | * | 12/1969 | Berta | 210/90 |
| 3,703,913 | A | * | 11/1972 | Carsten | 137/601.2 |
| 3,715,032 | A | * | 2/1973 | Nicko | 210/133 |
| 3,868,991 | A | * | 3/1975 | Sheppard | 165/283 |
| 3,957,083 | A | * | 5/1976 | Gallo | 138/43 |
| 4,077,876 | A | * | 3/1978 | Southall | 210/136 |
| 5,643,446 | A | * | 7/1997 | Clausen et al. | 210/184 |
| 5,695,168 | A | * | 12/1997 | Williams | 251/149.4 |
| 5,914,037 | A | * | 6/1999 | Yen | 210/234 |
| 6,269,837 | B1 | * | 8/2001 | Arent et al. | 137/614.04 |

* cited by examiner

*Primary Examiner*—Thomas M Lithgow
(74) *Attorney, Agent, or Firm*—Rolyance, Abrams, Berdo & Goodman, L.L.P.

(57) ABSTRACT

A filter device has a filter housing part (10) with a filter element (12) and can be detachably connected to another filter housing part (20). A valve (24) clears a fluid path in the interconnected state of the housing parts (10, 20) with the filter element, and in the separated state of the housing parts (10, 20) from one another or without the filter element at least partially blocks it. Instead of known quarter-turn fastener and stopper solutions, a blocking is devised which can be economically implemented and which requires decidedly less installation space. A process for operation of a filter device is also provided.

9 Claims, 3 Drawing Sheets

FILTER DEVICE AND PARTS THEREOF AND A METHOD FOR OPERATING OF THE FILTER DEVICE

FIELD OF THE INVENTION

The present invention relates to a filter device having a filter housing part comprising a filter element and detachably connected to another filter housing part. The present invention furthermore relates to certain parts of the filter device and a method for its operation.

BACKGROUND OF THE INVENTION

The prior filter devices include, among others, so-called spin-on filters. In their filter housing parts, a filter element designed especially for the respective filtration task is integrated. If the filter element is clogged with dirt causing the filter device to become unusable for its filtration task, the entire filter device, that is, the filter housing in addition to the filter element, must be replaced by a new filter device. This replacement has the disadvantage that the entire unit must be disposed of, although the actual filter housing part would still be usable. To remedy this situation, conventionally in the spin-on filter only the used filter element need be replaced such that the filter housing part with a new filter element can be used as a newly assembled filter device, especially for removing dirt from hydraulic circuits. Fundamentally, the problem arises that operators or even specially trained maintenance personnel forget to use a new filter element. Then, the reconnected filter housing part designed as a screw-in cartridge, even without the filter element, enables operation of the hydraulic system, but without dirt in the fluid flow being removed. Serious damage to the entire hydraulic system can then occur. Comparable problems also arise for other fluid media such as gases or pasty media.

To be able to establish greater operating reliability in this respect, DE 10 2004 014 149 A1 discloses a quarter-turn fastener as a fastening means by which the filter housing can be detachably mounted on the fluid means of the hydraulic circuit. By the rotary motion of the filter housing when the quarter-turn fastener is released and locked, a blocking part is controllable which blocks and clears the pertinent fluid connection. In this way, the filter can be reliably changed. A comparably designed solution is also shown in DE 10 2004 008 879 A1, where, instead of the quarter-turn fastener, a stopper with a plate-shaped slide part is provided for blocking and clearing the fluid connections. These solutions are very reliable in operation. Both the quarter-turn fastener and the stopper however require a relatively large amount of installation space, and thus, engender the corresponding production costs.

SUMMARY OF THE INVENTION

An object of the present invention is to provide an improved filter device having low production costs, reduced installation space, and a blocking solution which ensures that the filter device can only be operated together with its associated filter element, even when the filter element is replaced by a new, unused element.

This object is basically achieved by a filter device where the blocking solution is a valve. In the interconnected state of the housing parts with a filter element, the valve clears a fluid path. In the separated state of the housing parts from one another or when connected without a filter element, the valve at least partially blocks the fluid path. This blocking solution can be economically implemented and requires considerably less installation space, compared to the described quarter-turn fastener and stopper solutions described above.

If the fluid flow through the filter device is completely stopped by the valve, the hydraulic control unit evaluates this as a problem, resulting in an error report being delivered from which the operating or maintenance personal can then detect the absence of the filter element or by choking the fluid volumetric flow the respective hydraulic function is maintained. However, the differential pressure on the filter device increases such that a correspondingly mounted fouling display responds when the element is absent and delivers the message "Fouled filter element to be replaced". The message is intended to cause the filter device to be checked with respect to its serviceability such that the possible absence of the filter element can be established without failure of the hydraulic components of the system occurring. Operators experienced in the handling of hydraulic machinery will moreover be able to recognize even without the display that the filter element is missing when the corresponding noise or slackening of machine performance occurs due to this choking of the volumetric flow.

In one preferred embodiment of the filter device of the present invention, the valve has a valve element which can be actuated via a trigger part of at least one of the two filter housing parts and/or of the filter element. Especially in the connected state of the housing parts, the trigger part opens the valve element. In their state with the housing parts separated from one another, the trigger part at least partially closes the valve element. In addition to the opening and closing function with possible choking of the volumetric fluid flow, via the indicated trigger part forced actuation of the valve element of the valve is ensured. In this respect, malfunctions are precluded. Preferably, the trigger part is a component of the interchangeable filter element, and the valve element is a component of the other filter housing part.

In another especially preferred embodiment of the filter device of the present invention, the valve element includes at least one valve component which, in the closed state of the valve element forms a fluid-tight membrane surface or borders fluid-choking passage points within the membrane surface. In the opened state essentially, the valve component enables free fluid passage from one filter housing part with the filter element inserted via it in the direction of the other housing part and vice versa. Based on the possible reversible fluid direction it is possible, with the valve actuated, to induce a backflushing process for the filter element to remove dirt from it in counterflow. The configuration of the valve element in the shape of a membrane makes it possible to still further reduce the required installation space.

The valve component preferably includes a type of spiral arm with spring-elastic properties. At least one of the spiral arms can end in a fixing ring which, designed as a locking or snap ring, then enables fixing of the valve in one of the filter housing parts with simple handling.

The present invention furthermore relates to a valve for the filter device and a specially designed filter element with a trigger part. The present invention furthermore relates to a method in which a fouling display based on the differential pressure is connected between a supply and discharge for fluid in the filter housing in such a way that in the absence of the filter element the valve chokes the fluid flow to maintain the function of the hydraulic circuit. The present invention furthermore relates to a method which calls for the control of the hydraulic circuit to deliver an error report and/or to turn off the hydraulic circuit in the absence of a filter element and with the valve closed.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
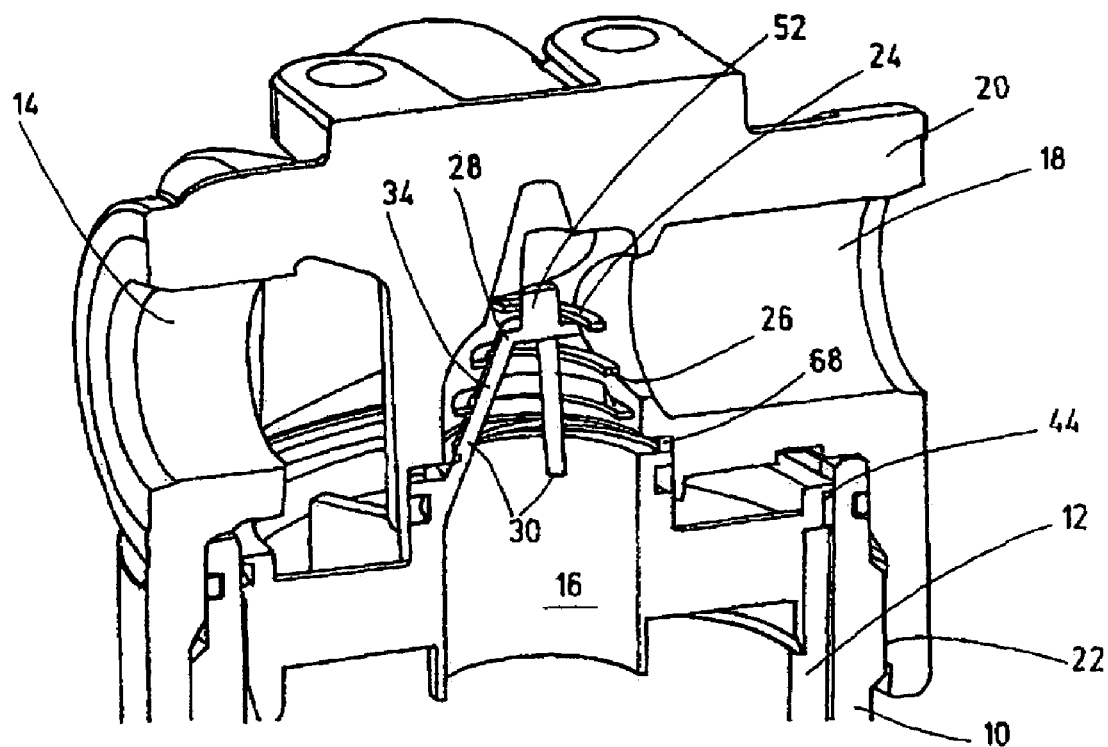
FIG. 1 is a partial, front elevational view in section, not to scale, of the head-side part of the filter device according to an embodiment of the present invention.
Figure 2:
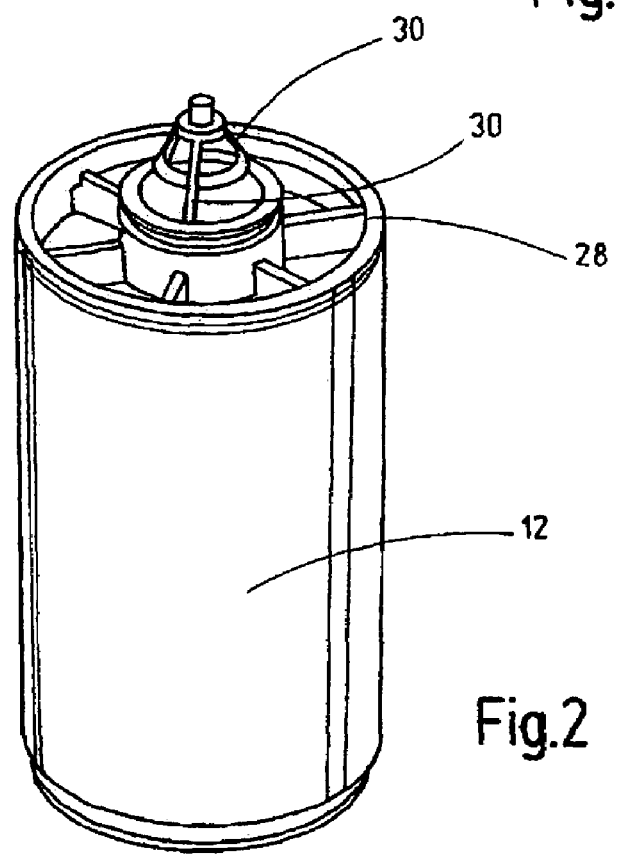
FIG. 2 is a top perspective view of a filter element to be inserted into the filter device of FIG. 1 with a trigger part.

The filter device shown in FIG. 1 has a cup-shaped filter housing part 10 surrounding the filter element 12, as is shown, for example, in FIG. 2. Flow takes place through the filter element 12 from the outside to the inside, as viewed in FIG. 1. The filter element has a conventional filter element structure which is not detailed, for example, comprising a pleated, multilayer filter mat supported against a fluid-permeable support pipe. Fouled fluid is optionally supplied from a hydraulic circuit (not detailed) via the fluid supply 14 to the filter device. Cleaned, filtered fluid travels via a center channel 16 of the filter element 12 to the fluid discharge 18 of the filter device. To be able to backflush the filter element 12, it would also be conceivable to operate the filter device in the reverse fluid direction. Likewise, it would be possible in a specially designed filter element 12 to reverse the direction of fluid throughflow so that then the fluid to be cleaned flows through the filter element 12 from the inside to the outside. In these instances, generally to support the pleated filter material, a support pipe or other support element such as a grating must be attached on the outer peripheral side of the filter element. This structure of a filter device is conventional will not be detailed. Conventionally, another filter housing part 20 forming a filter head and having a supply 14 and a discharge 18 extends over the filter housing part 10 on its upper free end on the front and to be detachably connected to the filter housing part 10 via a screw-on or threaded section 22.

Figure 4:
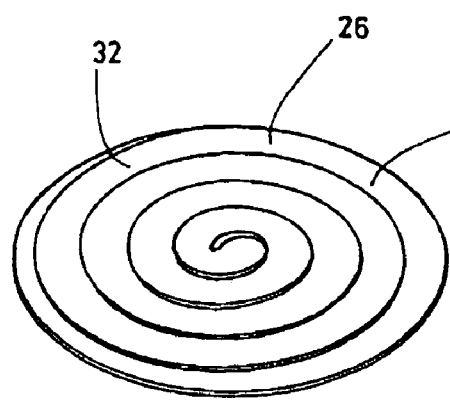
FIG. 4 is a perspective top view of an insertable valve according to a first embodiment of the present invention.
Figure 7:
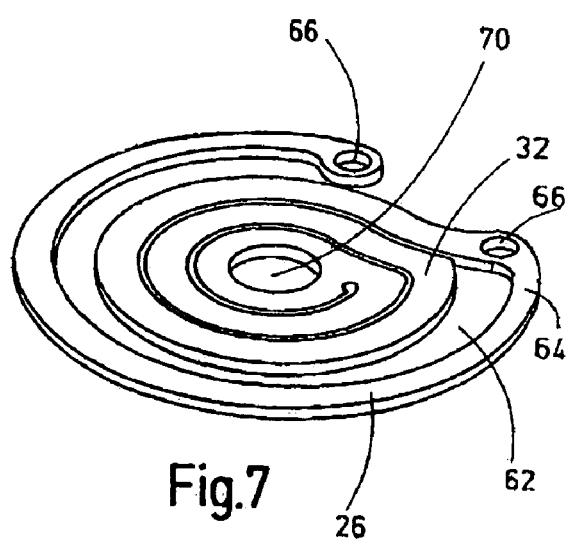
FIG. 7 is a perspective top view of an insertable valve according to a third embodiment of the present invention.
Figure 5:
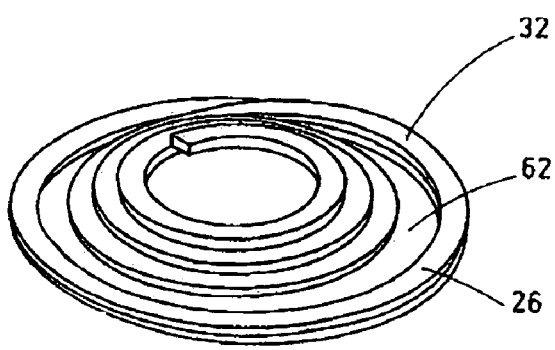
FIG. 5 is a perspective top plan view of an insertable valve according to a second embodiment of the present invention.
Figure 6:
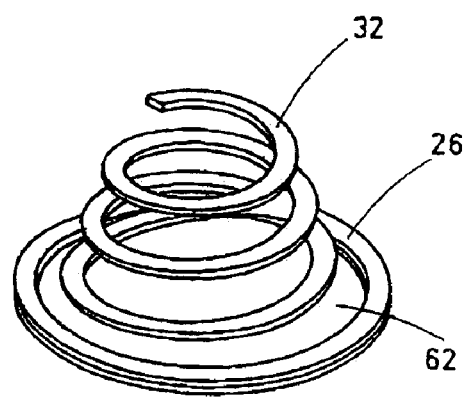
FIG. 6 is a perspective top view of the insertable valve of FIG. 5 in an open operating state.

The filter device furthermore has a valve 24, as shown in FIG. 4. Other solutions or embodiments for the valve 24 are shown in FIGS. 5 to 7. If, as shown in FIG. 1, the two housing parts 10, 20 are connected to one another, the valve 24 is moved into the open position to clear the fluid-carrying path. In the separated state of the housing parts 10, 20 from one another, the fluid-carrying path between the center channel 16 and the fluid discharge 18 is blocked. In the absence of a control part and designed as a complete closure (valve function), the valve remains closed until the pressure p1 has reached or exceeded the opening pressure $p_0$ of the valve, i.e., $p_1 < p_0 : p_2 = 0$ for an unpressurized connection to the tank, volumetric flow $Q=0$, $p_1 \geq p_0 : p_2 = p_1 \cdot \Delta p_{valve}$, ideally for $\Delta p_{valve} = 0$: $p_2 = p_1$.

In the absence of the control part and designed as a choke (spiral disk with passages), a pressure drop will take place over the component so that p1>p2. The resulting pressure difference $\Delta p_{valve}$ is used to trigger a signal of an optionally connected fouling display.

Figure 3:
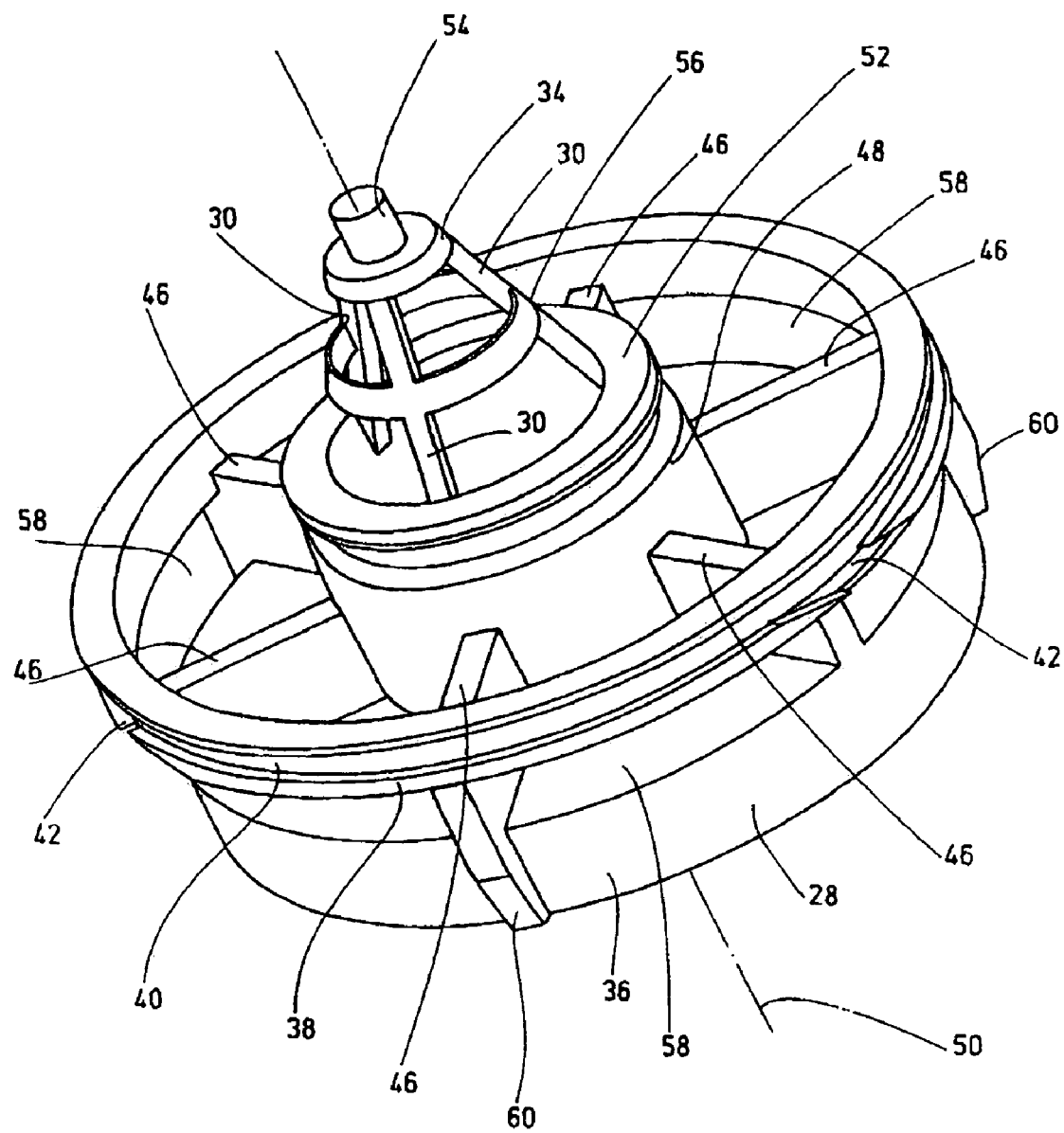
FIG. 3 is a perspective top view of the trigger part of FIGS. 1 and 2.

As shown in greater detail in FIG. 4, the valve 24 has a valve element 26 which can be actuated via a trigger part 28, as is detailed in FIG. 3. In this case, the trigger part as shown in FIGS. 1 and 2 is a component of the filter element 12. As a result of the trigger part's conically tapering control parts on its free front end in the form of opposing bridge surfaces, the trigger part is able to push against the closed valve disk as shown in FIG. 4, into an open spiral configuration, as shown in FIG. 1. If the two filter housing parts 10, 20 are separated from one another by unscrewing over the screw-on section 22, the trigger part 28 disengages from the valve 24, and the valve element 26 assumes its largely closed position in the form of a flat membrane surface as shown in FIG. 4.

Since the valve component of the valve element 26 in the embodiments as shown in FIGS. 1 and 4 is formed from a spiral arm 32 with spring-elastic or resilient properties, this process of pushing can be repeated as often as desired for an opening process and spring-elastic resetting for closing the valve 24. In this way, a very large number of changing processes for new filter elements 12 is possible if, when fouled, they are to be replaced by new filter elements. Since the valve 24 can be fixed interchangeably in the upper filter housing part 20, upon a possible failure of the spiral arm 32, replacement of the valve element 26 is possible. This interchangeability is however not absolutely necessary. The spiral arm 32 made from a flat metal plate can be obtained by conventional cutting technology, also including laser cutting, water jet cutting, etc. A correspondingly wound wire with round or rectangular cross section could likewise be used.

The metal base plate as the base material, preferably made in circle form, need not be spring-elastic. The resetting moment or force for closing the valve 24 can likewise arise exclusively by the raising of the spiral arm 32 in helical form by the trigger part. The raising plug 34 tapers to the outside (compare enlargement as shown in FIG. 3), and, in terms of its outside contour is matched to the spiral line of the raising arm. In this way, the spiral arm 32 undergoes guidance both for the pushing process and also for the resetting process to ensure especially careful actuation of the valve element 26.

The trigger part 28 is shown as an individual component in FIG. 3 for better illustration. The trigger part 28 on the bottom side has a contact-making plate 36 which can be moved into the top end of the filter element 12 until the free end of the filter element 12 comes into contact with the encompassing edge 38. This encompassing edge 38, on its outer peripheral side, has an engagement groove 40 interrupted by engagement points 42 which point down and are preferably diametrically opposite one another. Points 42 ensure that by a corresponding catch or lock connection the annular trigger part 28 is detachably fixed with a corresponding strip-like or cam-like engagement part 44 on the inside of the cup-shaped filter housing part 10 (compare FIG. 1). A cylindrical center plug 48 is located on the top of the contact-making plate 36 by individual stiffening bridges 46, and is permanently connected to the contact-making plate 36 and to the stiffening bridges 46, and is permanently connected to the contact-making plate 36 and to the encompassing edge 38. The individual stiffening bridges 46 extend radially to the outside away from the longitudinal axis 50.

The top of the center plug 48 is connected to the raising plug 34. The three inserted control parts 30 extend between an annular flange 52, on the top end of the center plug 48, and a contact-making and pushing pin 54 on the free end of the trigger part 28. These bridge-like trigger parts 30 can be further stiffened by at least one middle ring 56. The fluid passages 58, bordered by the stiffening bridges 46, the top of the contact-making plate 36 and the bottom of the encompassing edge 38 are used for incident flow onto the actual filter element with its filter medium in the seated state. The fluid passages 58 more or less form the inflow channel between the filter element and the optional "dirt catcher" used to catch dirt in the direction of flow through from the outside to the inside. The insertion bevels 60 point down on the stiffening bridges 46 to facilitate insertion of the trigger part 28 into the (optional) dirt catcher along its upper edge. This trigger part 28 preferably is formed of a plastic material which can be economically produced, for example, by an injection molding process. For permanent connection of the trigger part 28 made in one piece to the filter material of the filter element 12 a cement connection (not detailed) can be used. Instead of three control parts 30, a different number of control parts (not shown) can also be used.

The filter element 12 with the trigger part 28 forms a manageable function unit which can be completely replaced as a replacement part and thrown away. But it is possible to reuse or recycle the plastic trigger part 28. It is still within the scope of the present invention, in an embodiment (not shown), to assign the trigger part 28 to the other filter housing part 20 and to provide the valve 24 on the filter element 12 accordingly.

If, as shown in FIG. 4, the valve element 26 of the valve 24 forms an essentially closed membrane surface, when the filter element is replaced and insertion of a new filter element 12 is forgotten. The valve 24 cannot be pushed by the trigger part 28 of the filter element 12 as shown in FIG. 1 into its open position, but remains in the closed valve position, causing a reporting or control means immediately to relay an error report to the operator indicating that the filter element 12 needs to be inserted for reliable operation of the system. In this way, dirt damage caused by lack of filtration within the hydraulic circuit can be reliably avoided.

Another approach for a functional valve 24 is given by the embodiment as shown in FIGS. 5 and 6. In the closed position shown in FIG. 5, between the parts of the spiral arm 32, a choking passage site 62 is provided both in the open position of the spiral spring valve shown in FIG. 6 and in its closed state shown in FIG. 5. The choking passage site enables a choked fluid flow coming from the middle channel 16 in the direction of the fluid discharge 18. Due to this fluid passage point, the hydraulic function can be further maintained. A fouling indicator (not detailed) operates based on pressure difference detection to be able, in the absence of the filter element 12 and accordingly with the closed spiral spring valve configuration as shown in FIG. 5, to signal the pertinent system state as fouling to compel filter element replacement. Thus, it is then established that the element 12 is not in its place in the housing part 10.

These pressure difference-controlled fouling displays are easily commercially available in a plurality of versions. When a working new filter element has been inserted, the pressure difference to be detected between the fluid supply 14 and the fluid drain 18 in the ideal case is near 0. As fouling increases, the pressure difference value then increases until the fouling indicator suggests replacement of the used filter element 12. A comparable pressure difference situation arises when the helical spring valve as shown in FIG. 5 remains closed without the filter element 12 inserted and choked fluid flow takes place only by the passage point 62. As a result of the spring elastic or resilient configuration of the spiral arm 32, an adjustment force is applied on the top of the filter element 12 pressing the filter element 12 in the direction of the bottom part of the filter housing part 10. This biasing force likewise contributes to an increase of operating reliability.

The other embodiment of the valve element 26 shown in FIG. 7 for the valve 24 has the particularity that in addition to the spiral arm 32, a fixing ring 64 is molded in one piece to the outside. The fixing ring 64 has two continuous points of application 66 for an actuating tool (not detailed), designed as spreading pliers. The pliers again allow detachably fixing of the valve element 26 as a snap ring in an assignable engagement groove 68 (compare FIG. 1) in the head-side filter housing part 20. In this configuration shown in FIG. 7, the valve element 26 in turn in the middle has an engagement opening 70 for passage of the contact-making and pushing pin 54 (compare FIG. 3).

Another desirable side effect in the described configuration of the filter device is that a key port system is achieved. For obtaining a serviceable filter device for a hydraulic circuit, it is necessary for the filter element 12 to have the indicated trigger solution 28. Otherwise, malfunctions on the hydraulic system occur. Since fundamentally knockoffs are being found to an increased degree in the replacement parts business and are often of lower quality, which the user cannot easily detect, it is possible for only original filter elements with the trigger part 28 and the fluid housing to be used with special valve technology. Cheap single elements conversely cannot be serviceably used. The bridges 30 with the center ring 56 of the trigger part moreover form a capture structure which keeps small parts such as screws, nuts or the like from falling into the interior of the filter element 12.

While various embodiments have been chosen to illustrate the invention, it will be understood by those skilled in the art that various changes and modifications can be made therein without departing from the scope of the invention as defined in the appended claims.

What is claimed is:

1. A filter device, comprising:
a first housing part;
a replaceable filter element within said first housing part;
a second housing part detachably connected to said first housing part;
a valve mounted on one of said filter element and said second housing part and movable between an open position when said housing parts are connected with said filter element therein to allow fluid flow therethrough and a closed position when said housing parts are separated to at least partially block fluid flow therethrough, said valve including a valve component with a resilient spiral arm; and
a trigger part mounted on the other of said filter element and said second housing part and having a conical outside surface matched to and engaging said spiral arm for moving said valve between said open and closed positions dependent on presence and absence, respectively, of said filter element in said filter housing part when said housing parts are connected.

2. A filter device according to claim 1 wherein
said trigger part is mounted on said filter element; and
said valve is mounted on said second housing part.

3. A filter device according to claim 1 wherein
said valve forms one of a fluid tight membrane surface and a membrane surface with fluid-choking passage points therein in said closed position, and forms a fluid passage conveying fluid between said housing parts in both directions therebetween in said open position.

4. A filter device according to claim 1 wherein
said valve component comprises a fixing ring transitioning from said spiral arm mounting said valve on said second housing part.

5. A filter device according to claim 4 wherein
said fixing ring comprises a snap ring.

6. A filter device according to claim 1 wherein
said first housing part comprises a filter cup for holding said filter element; and
said second housing part comprises a filter head with fluid connections therein.

7. A filter device according to claim 6 wherein
said fluid connections comprise an inlet and an outlet.

8. A method for operating a filter device in which a pressure differential fouling indicator is connected to a fluid inlet and fluid outlet in a filter housing, comprising:
   detachably connecting a first housing part with a second housing part;
   when the first housing part has a replaceable filter element therein during the connection of the housing parts, moving a resilient spiral spring arm valve mounted on one of the filter element and the second housing part to an open position to allow fluid flow therethrough from a closed position by engaging a trigger part mounted on the other of the filter element and the second housing part and having a conical outside surface matched to the spiral spring arm;
   when the first housing part fails to contain the filter element therein during the connection of the housing parts, retaining the valve in the closed position thereof to at least partially block and choke fluid flow therethrough to maintain functioning on a hydraulic circuit connected to the filter device and cause the fouling indicator to produce a fouling display without tolerances; and
   maintaining the valve in the closed position when the housing parts are separated.

9. A method according to claim 8 wherein
during absence of the filter element and with the valve closed, a hydraulic circuit control one of delivers an error report and turns off the hydraulic circuit.

* * * * *